United States Patent [19]

Mayfield

[11] 4,314,460
[45] Feb. 9, 1982

[54] LINKED TORSIONAL MISALIGNMENT COUPLING

[76] Inventor: Alfred B. Mayfield, c/o William R. Scarborough, 512 Nicollet Mall, #707, Minneapolis, Minn. 55402

[21] Appl. No.: 37,004
[22] Filed: May 8, 1979
[51] Int. Cl.³ .............................................. F16D 3/54
[52] U.S. Cl. .......................................... 64/19; 64/21; 64/31
[58] Field of Search .......................... 64/19, 12, 31, 21

[56] References Cited

U.S. PATENT DOCUMENTS

| | | | |
|---|---|---|---|
| 268,807 | 12/1882 | Landis | 64/19 |
| 2,837,901 | 6/1958 | Chapman | 64/12 |
| 4,033,144 | 7/1977 | Allen | 64/19 |
| 4,084,411 | 4/1978 | Mayfield | 64/19 |

Primary Examiner—Ira S. Lazarus
Assistant Examiner—Magdalen Moy

[57] ABSTRACT

A constant velocity torque transmitting coupling presenting a dynamically balanced operation under variable degrees shaft misalignment in a transmission system.

A plurality of rotatable linkages are mounted for revolution about a common axis and a link, rotatable about each end of a linkage, connects one end to a driving member and the other end to a driven member. A synchronizing linkage is connected between each of the links in a linkage.

1 Claim, 4 Drawing Figures

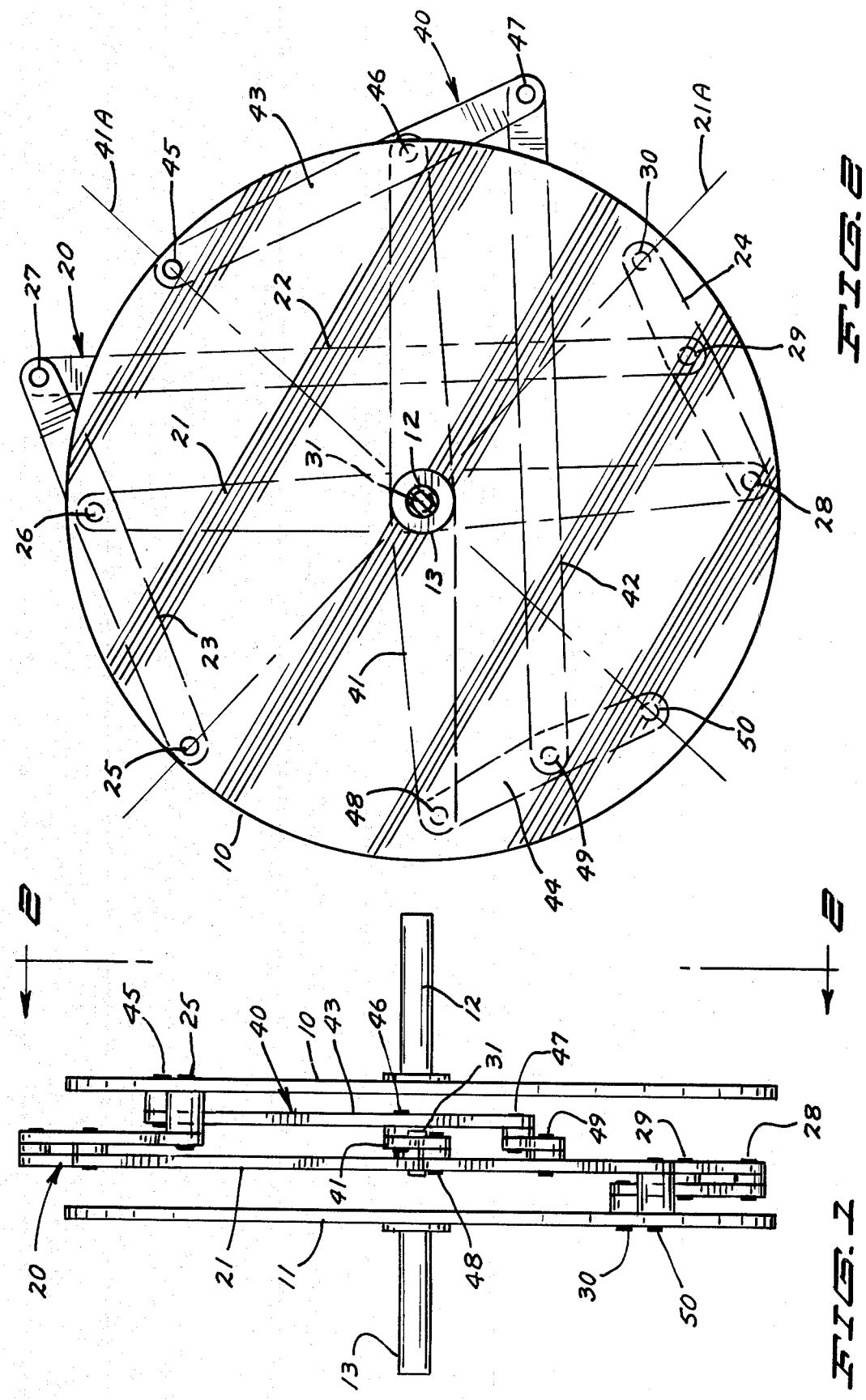

4,314,460

LINKED TORSIONAL MISALIGNMENT COUPLING

BACKGROUND OF THE INVENTION

This invention relates generally to torque transmitting couplings between input and output members in a mechanically powered transmission device. My invention relates particularly to torque transmitting devices in which relative movement, such as axial alignment, angular alignment or axial displacement may occur.

Examples of prior art devices are my own patent, U.S. Pat. No. 4,084,411, Apr. 18, 1978 for RADIAL MISALIGNMENT COUPLING; and U.S. Pat. Nos. 3,791,170 and 3,242,694, issued to R. Schmidt on Feb. 12, 1974 and Mar. 29, 1966 respectively.

SUMMARY OF THE INVENTION

The present invention affords a constant velocity coupling for two shafts that may be axially, angularly or linearly misaligned wherein the misalignments may be of a changing nature dependent upon the operation of the device in which the apparatus is utilized to transmit torque.

My invention provides a torque transmitting device in which a plurality of linkages, pivotal about a common axis, are each connected with a driven and a driving member and include a means for synchronizing the movement of the pivots disposed on the driven and driving members whereby the connections to the driven and driving members of a coupling are maintained on an axis extending through the axes of the pivotal connection of the linkages and the pivotal connections to the driven and driving members.

BRIEF DESCRIPTION OF THE DRAWINGS

FIG. 1 is a side elevational view illustrating my invention;

FIG. 2 is a side elevational view of the apparatus shown in FIG. 1;

Figure 3:
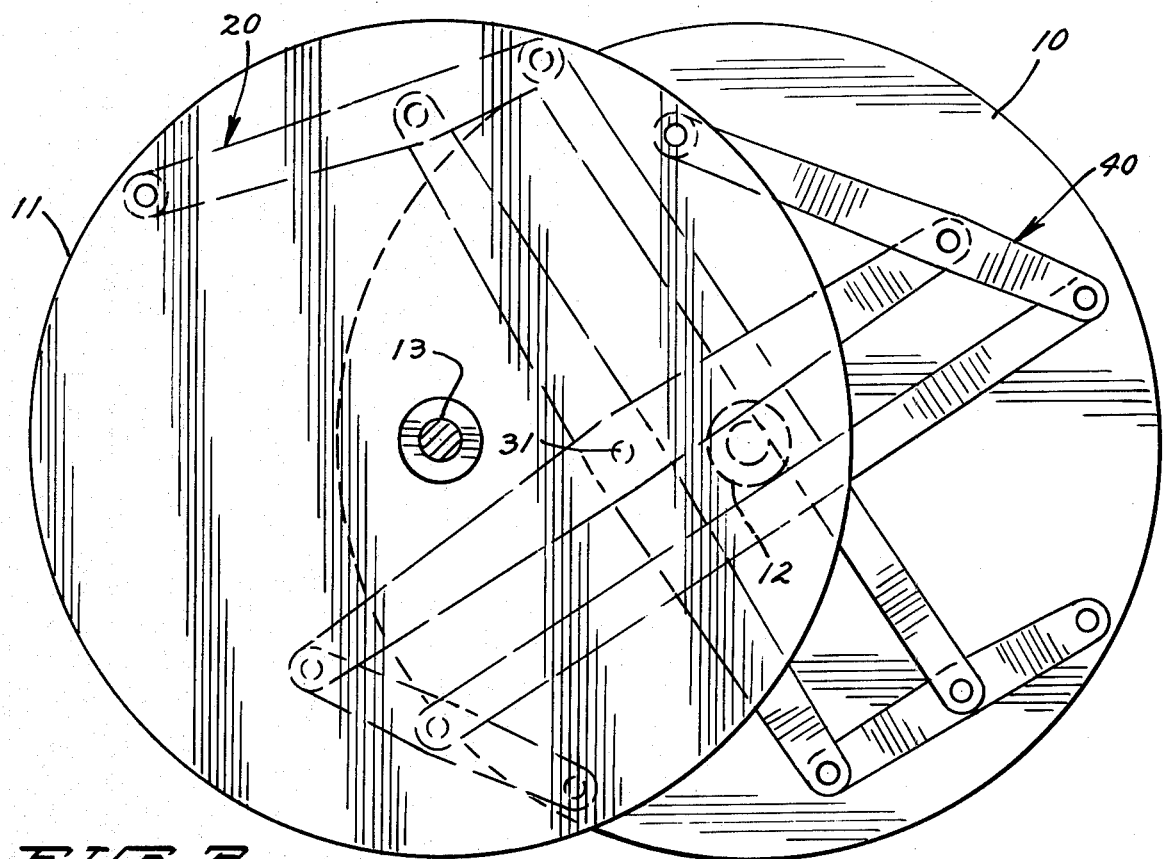
FIG. 3 is a side elevational view illustrating the relationships of the various elements of my invention under one portion of a cycle of operation.

Referring now to the drawings, my invention is illustrated as applied to a driving member 10 shown in the form of a disk disposed on a shaft 12 and a drive member 11 shown disposed on a shaft 13. The axes of rotation of shafts 12 and 13 may be radially, angularly or linearly misaligned. For convenience, the driving and driven disks have been shown as transparent so that the elements of the driving means of my invention may be more easily discerned.

In the illustrative embodiment of my invention, a pair of linkage members indicated generally by reference characters 20 and 40 are disposed to transmit torque from driving member 10 to driven member 11.

Linkage 20 includes a main bar 21, a parallel bar 22, an elongated connecting bar 23 and a short connecting bar 24, all interconnected by suitable pins which are designed to permit relative rotative movement between the various elements. In particular, elongated connecting bar 23 on linkage 20 is connected to disk 10 through a pin 25 at its left end, connected to one end of main bar 21 intermediate its ends through pin 26 and to parallel bar 22 at its right end by pin 27. Similarly, the shorter connecting bar 24 is shown connected to the other end of main bar 21 at its left end through pin 28 to the lower end of parallel bar 22 intermediate its ends through pin 29 and to driven member 11 through pin 30.

In similar manner, linkage 40 is provided with a main bar 41, A parallel bar 42, an elongated connecting bar 43 and a short connecting bar 44. With specific reference to FIG. 2 of the drawings, elongated bar 43 is connected at its top end to driving member 10 through pin 45, intermediate its ends to bar 41 through pin 46 and at its lower end to parallel bar 42 through pin 47. Short connecting bar 44 is shown connected to the other end of parallel bar 42 at its midpoint through pin 49 and to driven disk 11 through pin 50.

Figure 4:
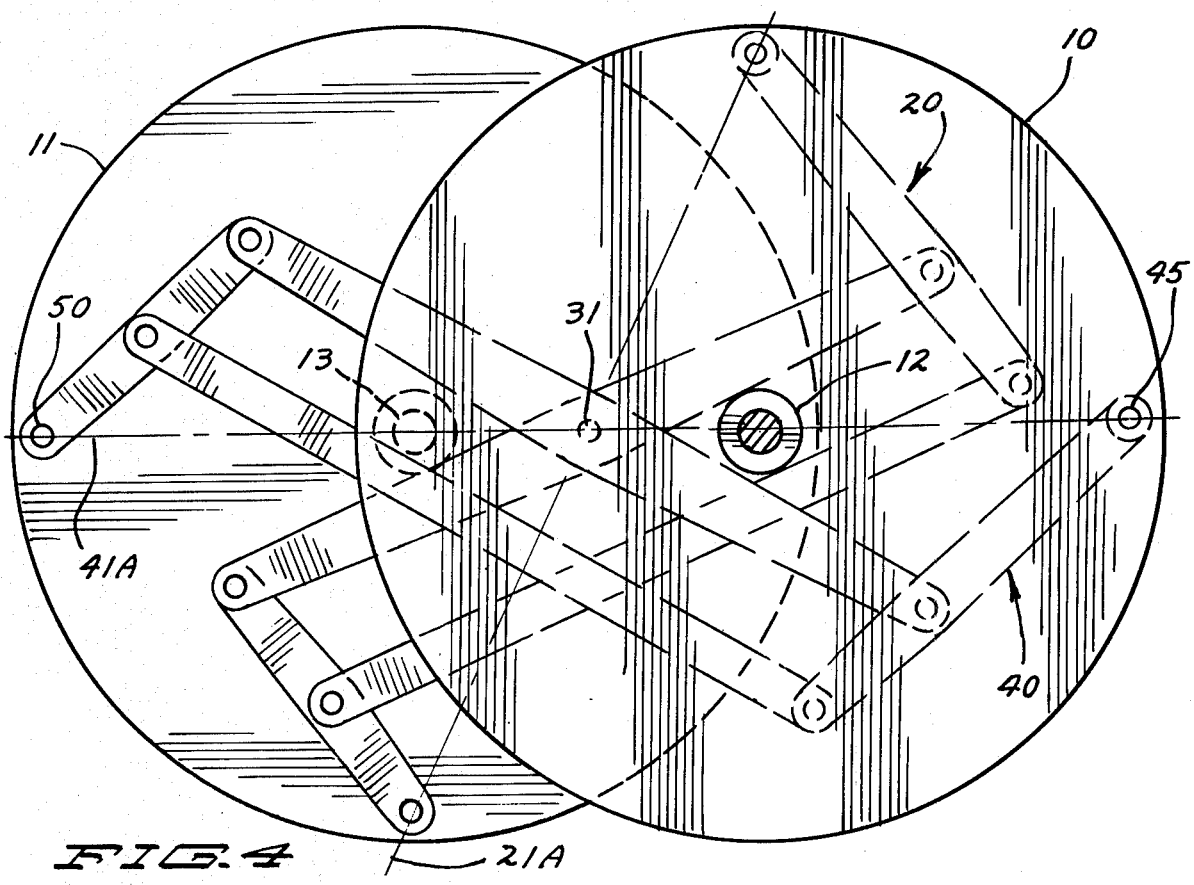
FIG. 4 is a further illustration of the relationship of the elements of my invention and in a further portion of a cycle of operation.

As may be seen more clearly on FIGS. 3 and 4, main bars 21 and 41 are rotatably disposed on pin 31.

The elements of linkages 20 and 21 may be comprised of any suitable material and may be posessed of a desired degree of flexibility. One suitable material may be aluminum of a thickness and other characteristics to provide any desired degree of flexibility for the members of which linkages 20 and 40 are comprised. For example, if one were dealing only with radial misalignment as is illustrated in FIGS. 3 and 4, the bar members may be made of rigid material. On the other hand, where a coupling may be subject to angular misalignment of the shafts of the input-driving and output-driven members of the coupling, or the shafts 12 and 13 may be subject to movement toward and away from one another, the flexibility of the linkages may be of a nature that will permit the movement while still retaining the basic operation of my coupling.

It may further be desirable, under certain conditions, to interconnect the members of the linkages with ball and socket or axially slidable pivots, however, the use of such elements is left to the imagination and discretion of the designer.

OPERATION OF THE PREFERRED EMBODIMENT

While the operation of my invention may be readily apparent from a consideration of the drawings, it may be seen that the essence of the operation is that the axes of pivot members of the center and each of the connections to the driven and driving disks move along a straight line. Reference to the centerline 41A disposed on FIG. 2 of the drawing which shows pivot 50 on bar member 44, pivot 31 common to linkages 20 and 40 and pivot 45 on bar member 43 disposed on centerline 41A. Similarly, reference to FIG. 1 will show that pivot members 45 and 50 are disposed radially outwardly a greater distance from common pivot member 31 while in FIG. 3 they are disposed a shorter distance radially inwardly of either of the positions of FIG. 2 or FIG. 4 of the drawings.

I claim:

1. A constant velocity flexible coupling comprising, in combination;

adjacently disposed input and output members each mounted upon a rotatable shaft;

at least a pair of linkage means for connection intermediate said input and output members, each of said linkage means including a main bar rotatably disposed on a pin, a first bar connecting one end to said input member, a second bar connecting the other end to said output member, said first bar being connected to a main bar intermediate its ends and said second bar being connected to a main bar at its opposite end and means interconnecting said first and second bar members, said last named means being connected to the opposite end of said first bar member and intermediate the ends of said second bar member whereby the ends of the first and second bar members connected to the input and output members are reciprocably operable along a plane intersecting said connections and said pin.

* * * * *